3,179,699
PRODUCTION OF CYCLOHEXANONE AND
CYCLOHEXANOL
Hans Joachim Waldmann and Herwig Hoffmann, both of Ludwigshafen (Rhine), Germany, assignors to Badische Anilin- & Soda-Fabrik Aktiengesellschaft, Ludwigshafen (Rhine), Germany
No Drawing. Filed May 2, 1961, Ser. No. 107,017
Claims priority, application Germany, May 6, 1960,
B 57,742
7 Claims. (Cl. 260—586)

This invention relates to improvements in the production of cyclohexanol and cyclohexanone by oxidation of cyclohexane. More particularly, the invention relates to a specific treatment of the oxidation mixture with alkali.

Cyclohexanone is known to be a valuable intermediate for the production of caprolactam and thus of polyamides. Formerly, it was prepared mainly by dehydrogenation of cyclohexanol which is obtainable from phenol by hydrogenation. As polyamides grew in importance, the desire also grew to secure sources of raw materials other than those based on phenol.

A number of methods have become known according to which cyclohexane is oxidized to cyclohexanol and cyclohexanone with oxygen or oxygen-containing gases at elevated temperatures and increased pressures and in the presence or absence of catalysts. In these methods, part of the cyclohexane is not oxidized directly to cyclohexanone or cyclohexanol, but is first converted into peroxides which are then decomposed to cyclohexanone during processing. The said methods are usually carried out in a plurality of successive stages, the degree of conversion being kept low. A disadvantage of this procedure is that considerable amounts of carboxylic acids and esters are formed in addition to the cyclohexanol and cyclohexanone desired. In particular, the cyclohexanol occurs to a considerable extent in the form of cyclohexyl esters. By the formation of esters, not only is the yield of the desired oxidation products diminished, but the separation of the mixture by distillation is also rendered more difficult. Moreover, the acids which are solid at room temperature are liable to be deposited in the apparatus so that stoppages and consequently interruptions in the operation of the process occur.

According to U.S. patent specification No. 2,565,087, this disadvantage can be avoided and in particular the formation of esters can be diminished by carrying out the oxidation in the presence of water, the amount of water being about 10 to 30% by weight of the hydrocarbon. Working in this way has the disadvantage that the apparatus must be larger for the same throughput and that water in this amount has an inhibiting effect on the reaction because it carries away from the reaction zone substances which accelerate the reaction. Moreover, as much as about 20% of the total cyclohexanol occurs in the form of esters.

According to U.S. patent specification No. 2,557,281, the water formed during the oxidation is continuously distilled off from each of the oxidation vessels used. It is only after the mixture has passed through all the oxidation stages that water is added thereto and the unreacted hydrocarbon removed in a current of steam. In this method also, considerable amounts of carboxylic acids and esters are present in the oxidation mixture besides cyclohexanone and cyclohexanol, so that the yield of cyclohexanol and cyclohexanone is only about 55% of the theory with reference to cyclohexane reacted.

In U.S. patent specification No. 2,825,742, a process is described in which the water formed during the reaction is also removed, but the oxidation mixture is intermediately extracted with water and this treatment is repeated after the end of the oxidation. In this way, the carboxylic acids are substantially removed, but the proportion of esters occurring in the cyclohexanone and cyclohexanol is considerable.

Oxidation has also already been carried out in the presence of aqueous alkalies (German patent specification No. 878,350), but even then products are formed which contain carboxylic acids and esters in considerable amounts, as may be seen especially from Example 1 of the specification. Moreover it has been found that this process is not really suitable for continuous commercial operation, because the oxidation in the presence of aqueous alkali solution, at least in the temperature range in which optimum yields of cyclohexanone and cyclohexanol are obtained, is initiated with difficulty or not at all or is readily stopped by adding alkali to the mixture after the oxidation reaction has set in.

According to U.S. patent specification No. 2,931,834, the oxidation is continued only up to a very low degree of conversion, the oxidation mixture is then concentrated by evaporation of part of the unreacted cyclohexane until it contains 5 to 20% by weight of oxidation products, and this concentrated mixture is then contacted with an alkali hydroxide.

Finally, it is known from U.S. patent specification No. 2,938,924 that cyclohexanol and cyclohexanone are obtained in an advantageous way by washing the oxidation mixture with water not only intermediately and after the end of the oxidation, but also treating it at least once with an alkali hydroxide or carbonate solution at an elevated temperature. The alkali treatment is as a rule an alkali washing in which sodium or potassium hydroxide (conveniently as a 5 to 30% solution) is added in about one quarter to a multiple of the amount of oxidation product to be treated. The alkali is thus used in an excess with reference to the carboxylic acids and esters contained in the oxidation mixture. The alkali treatment may be carried out prior to separation of the unreacted cyclohexane or after partial or complete separation thereof. It is also possible to carry out two alkali treatments, for example the first after the end of the oxidation but prior to distilling off the excess cyclohexane, and the second after substantial removal of the excess hydrocarbon.

The two last-mentioned methods are satisfactory in so far as acids and esters are to a very large extent separated prior to the distillative separation of the oxidation mixture. In partciular, the cyclohexyl esters are split up so that the cyclohexanol contained therein can be recovered. Neither of the two processes, however, like the other known methods starting from cyclohexane, is fully satisfactory, because the purity of the cyclohexanone does not satisfy the high requirements placed on caprolactam precursors. The cyclohexanone obtained is very well suited for the production of adipic acid and hexamethylene diamine, but the production of caprolactam on the basis of cyclohexanone which has been obtained by oxidation of cyclohexane has hitherto not acquired any appreciable industrial importance. The reason for this is that the further processing of such cyclohexanone is attended by considerable difficulty. For one thing, strong discoloration is often observed in the Beckmann arrangement of the oxime prepared from such cyclohexanone. For another, there is an increase in the formation of resinous products which unfavorably affect the working up of the rearrangement mixtures. These phenomena may be connected with the presence of small amounts of other ketones in the cyclohexanone. These ketones or their oximes are evidently less stable under the conditions of the Beckmann rearrangement than cyclohexanone oxime. Even more serious is the fact that the caprolactam in this case is less stable to potassium permanganate and therefore does not satisfy the increasing requirements as to quality.

Another undesirable effect of small amounts of by-products in cyclohexanone obtained from cyclohexane by prior art methods resides in the fact that the separation of caprolactam from the aqueous phase formed by neutralization of the rearrangement mixture, for example with ammonia, can be effected only with difficulty, the phases separating only very slowly. This may be due to the presence in the cyclohexanone of small amounts of esters, which under the conditions of the Beckmann rearrangement are converted into substances which have a certain emulsifying action.

It should be emphasized that the amounts of these undesirable impurities in the cyclohexanone are very small. They cannot be detected by the usual analytical methods. For example the carbonyl number of such a contaminated cyclohexanone does not differ from that of a pure cyclohexanone which has been obtained from phenol by hydrogenation to cyclohexanol and subsequent dehydrogenation of the latter substance.

According to our investigations, the said disadvantages can be obviated by continuing the treatment of the oxidation mixture containing at least 30% by weight of cyclohexane with alkaline liquids for a sufficiently long period. The 13.6 minutes specified in U.S. patent specification No. 2,931,834 is not sufficient. It is obvious that the necessary period is dependent to a considerable extent on the temperature and on the intensity of the mixing. It is however hardly possible to achieve satisfactory results with treatment periods of less than one hour. Frequently, the treatment must be continued for several hours. For this purpose, very large apparatuses are required. This is especially so when the reaction mixture is subjected to the alkali treatment without separation of part of the unreacted cyclohexane.

We have also found that a cyclohexanone with satisfactory properties is obtained with a shorter alkali treatment if the cyclohexane is distilled off to a very large extent, i.e., to a content of 1 to 20% by weight, prior to the alkali treatment. In this case, however, separation of the aqueous phase from the organic phase offers great difficulty, the treated mixture being present in the form of a very stable emulsion. This difficulty could of course be overcome by adding a large amount of cyclohexane, but the cost of distillation would then be increased in an undesirable way.

It is an object of the present invention to provide a process by which, from the mixtures obtained by oxidation of cyclohexane, a cyclohexanone is obtained which satisfies exacting requirements as to purity and can be processed into caprolactam without the difficulties described above. It is another object of the invention to provide a process by which this advantage is achieved with short treatment periods and little expenditure of apparatus. It is a further object of this invention to provide a process in which no difficult phase separation is necessary. Other objects of the invention will become apparent from the following detailed description.

In accordance with the present invention we have found that the said objects and advantages are achieved by contacting a mixture, which has been obtained by oxidation of cyclohexane and which contains between 30 and 98% by weight of cyclohexane, with an aqueous alkali solution at an elevated temperature. The alkali solution is then separated from the oxidation mixture and the latter freed from cyclohexane to such an extent that the content thereof is less than 20% by weight, preferably 1 to 10% by weight. Alkali is then added to the oxidation mixture in an amount corresponding to 0.20 to 0.95 equivalent of the esters still present in the mixture and the mixture heated for a short time at a temperature between 130° and 160° C. Pure cyclohexanone and pure cyclohexanol are then recovered from the mixture by distillation, conveniently under reduced pressure, without previous separation of the alkali. The cyclohexanol may then be dehydrogenated in the usual way to cyclohexanone.

The oxidation of cyclohexane that leads to mixtures which can be worked up according to the present invention is carried out in conventional manner. Working is at 120° to 170° C., preferably at 140° to 150° C., at a pressure up to 70 atmospheres, preferably 10 to 40 atmospheres. It is advantageous to use air as the oxygen-containing gas, if desired diluted with an inert gas such as nitrogen. Oxidation is preferably carried out in two or three stages, the degree of conversion being 1 to 15%, especially 4 to 10%. It is recommendable to add an oxidation catalyst, such as cobalt naphthenate, in a small amount, for example 0.0003 to 0.01% by weight with reference to the cyclohexane. The water formed in the course of the reaction may be left in the reaction mixture or may be distilled off continuously. It is possible to carry out a water wash after one oxidation stage, after more than one oxidation stage, or after every oxidation stage. A water wash is especially recommendable after the final oxidation stage. For these water washes, 0.2 to 10% by weight, especially 0.5 to 4% by weight with reference to the oxidation mixture, of water or used washing solution is in general used. The washing is carried out at a temperature between 60° and 120° C., preferably between 75° and 110° C., and at pressures between 2 and 50 atmospheres, especially between 10 and 40 atmospheres.

An essential feature of the present invention is an alkali treatment of the oxidation mixture after oxidation is ended. By the term "alkali treatment" as used herein we mean the contacting of the oxidation mixture with an aqueous solution of an alkali hydroxide or carbonate. It is advantageous to treat with alkali the oxidation mixture as it comes from the water wash after the final oxidation stage. However, part of the unreacted cyclohexane may be previously distilled off so that the cyclohexane content is 30 to 98% by weight. Lower contents of cyclohexane are not recommendable because in this case phase separation is difficult. The oxidation mixture is contacted with a 10 to 30% by weight, preferably 10 to 25% by weight, aqueous alkali solution. The amount of alkali is 0.05 to 3.00, especially 0.10 to 1.50% by weight, calculated as KOH and based on the cyclohexane used as initial material. The temperature in the alkali treatment lies between 60° to 150° C., especially between 90° and 130° C. The pressure is chosen so that the mixture is present in the liquid state. Pressures between 2 and 50 atmospheres are preferred. The duration of the alkali treatment is 2 to 60 minutes, advantageously 5 to 25 minutes. The higher the temperature is within the stated limits, the shorter can the treatment period be. It is obvious that the duration of the treatment will also be dependent on the intensity of the mixing of the different phases. For example good results may be obtained in a vessel fitted with an impeller or in a closed mixing tube having rigid inserts, in which the treatment mixture is circulated.

The aqueous phase is then separated from the oxidation mixture. The amount and concentration of the alkali solution depend on the conditions of the oxidation, especially on the degree of conversion. They should be such that the separated aqueous phase still contains at least 1% by weight and preferably up to 10% by weight of free alkali. The exact conditions for a given case can readily be ascertained by a preliminary experiment.

By this first alkali treatment, practically all acid reacting substances are removed from the organic phase and the cyclohexyl peroxides are decomposed to cyclohexanol and cyclohexanone. Furthermore, all readily saponifiable esters are split. The acid components of these esters are also found in the aqueous phase. If desired, the acids may be set free from their aqueous solution by adding mineral acid and recovered. After this first alkali treatment, a washing with water is advantageous for the removal of residual alkali compounds because otherwise incrustations may occur in the subsequent distillation. This water wash may be carried out under the same conditions as the water wash prior to the first alkali treatment.

Further cyclohexane is then distilled off from the oxidation mixture so that the content of the same is less than 20% weight, especially 1 to 10% by weight. It is essential for the success of the process that the cyclohexane be removed to this extent. It is only then possible to carry out the second alkali treatment in a short time. The saponification number is then determined in the oxidation mixture and 0.20 to 0.95, advantageously 0.30 to 0.75, and especially 0.30 to 0.50, equivalent of alkali, with reference to the amount of esters thus ascertained, are added. The term "alkali" again refers to alkali hydroxide or carbonate. For the second alkali treatment it is preferred to use a potassium compound, i.e., potassium hydroxide or potassium carbonate. This has the advantage that the distillation residue which occurs in the subsequent distillation and which contains the alkali is easier to remove from the distillation apparatus because it is liquid, whereas it tends to stick to the apparatus when a sodium compound is used. The alkali is advantageously used in the form of a 10 to 50%, especially 10 to 25%, aqueous solution. The oxidation mixture is then heated for 0.1 to 10 minutes at a temperature between 130° and 160° C., the pressure being in general from 1 to 10 atmospheres, especially 1 to 5 atmospheres. It should be noted that 10 atmospheres is not a critical limit. This pressure is however usually sufficient to avoid the distilling off of considerable amounts of volatile constituents. The second alkali treatment is advantageously carried out continuously by leading the mixture through a heated tube. Pure cyclohexanone and pure cyclohexanol are then recovered from the treatment mixture by fractional distillation, advantageously under reduced pressure, for example 1 to 200 mm. Hg absolute. The alkali remains in the distillation residue in the form of salts.

Surprisingly, only a deficiency of alkali with reference to the esters present is necessary in the second alkali treatment. Evidently, the relatively readily volatile esters, which would otherwise distil over in part, are preferentially split. This applies especially to the cyclohexyl esters usually contained therein. There is thus no loss in yield of desired products as a result of the deficiency of alkali. On the contrary, condensation reactions, to which cyclohexanone tends in the presence of excess alkali, are suppressed.

If the cyclohexanol is not required for some other purpose, it is dehydrogenated to cyclohexanone. This dehydrogenation is carried out in the usual way, for example in the gas phase at temperatures between 150° and 400° C., preferabably between 200° and 350° C., with the known dehydrogenation catalysts, such as copper, nickel, zinc, oxides of the groups V or VI of the Periodic System, such as vanadium oxide, moylbdenum oxide or chromium oxide, if desired on carriers such as alumina, silicic acid, silicates, magnesia, titanium dioxide or zirconium dioxide. The dehydrogenation product is preferably returned to the process, for example to the oxidation mixture after the second alkali treatment. It is also possible, however, to distil the dehydrogenation product by itself and to obtain pure cyclohexanone in this way.

By the new process, a cyclohexanone is obtained which fully satisfies the high requirements such as are placed on caprolactam precursors. The two alkali treatments together require considerably less time and consequently smaller apparatus than must be used in order to obtain products of similar purity by washing with alkali, oxidation mixtures still containing considerable amounts of cyclohexane. Separation of aqueous and organic phases offers no difficulty.

The invention is illustrated by, but not limited to, the following example.

*Example*

The actual oxidation of cyclohexane is carried out in the following way:

12.7 metric tons per hour of cyclohexane are led through two successive vertical reaction vessels each having a capacity of 8 cubic meters. 560 cubic meters (N.T.P.) of air and 7.5 grams of cobalt in the form of cobalt naphthenate, dissolved in cyclohexane, are introduced per hour at the same time into each reaction vessel. The temperature in the reaction vessels is kept at 145° C. by the temperature of the cyclohexane or oxidation mixture supplied. The pressure is 24 atmospheres gauge. The oxidation mixture escapes at the top with the gases. The oxidation mixture is washed after each reaction vessel with about 80 kilograms of water to remove the bulk of the carboxylic acids formed. About two-thirds of the monocarboxylic and dicarboxylic acids formed, especially adipic acid, are thus removed. After flowing through the last reaction vessel, the oxidation mixture is washed a second time, about 150 kilograms of fresh water being added during the second washing. This extraction water, which contains only little acid, is divided into equal parts, after separation of the oxidation mixture, and used for extraction after the first reaction vessel or for the first extraction after the second reaction vessel. This stagewise extraction removes the bulk of the carboxylic acids formed. The total conversion is 5% in all three stages.

The carboxylic acids of little solubility in water, the lactones and the half-esters still contained in the product are washed out after the third water wash by a wash with about 90 kilograms of 15% caustic soda solution at 100° at 110° C. This wash lasts 6 minutes. Part of the ester obtained in also split. After separation of the alkaline solution, which still contains 3% of free alakli, the mixture is washed again with about 75 kilograms of fresh water and the washing water is separated from the oxidation mixture. The excess cyclohexane is separated from the oxidation product by distillation. The bath temperature is 125° C. toward the end of the distillation and the pressure is 300 mm. Hg. A residue consisting of 210 kilograms of cyclohexanone, 315 kilograms of cyclohexanol and 30 kilograms of higher boiling constituents is obtained per hour.

This 555 kilograms of oxidation product free from cyclohexane has a sponification number of 3.3 and is then treated with alkali a second time. 3.75 kilograms per hour of 25% caustic potash solution is added through a mixing jet and the mixture led at a temperature of 140° C. and with a residence period of 1 minute through a heating tube. Cyclohexanone and cyclohexanol are then recovered in two fractionating columns at a pressure of 30 mm. Hg in the usual way.

201 kilograms per hours of cyclohexanone is obtained with the saponification number 0.1 and a postassium permanganate stability of 60 minutes, and 322 kilograms of cyclohexanol with a saponification number of 0.8 and a cyclohexanone content of about 2%. Moreover, 33 kilograms per hour of a distillation residue is obtained which contains the potassium salts dissolved therein and has a saponification number of 18.

By potassium permanganate stability we understand the time required for 3 drops of 0.1% permanganate solution to become decolored in 10 cc. of cyclohexanone at 20° C.

What we claim is:

1. A process for the production of cyclohexanone and cyclohexanol which comprises oxidizing cyclohexane with a gas selected from the group consisting of oxygen and gas mixtures containing oxygen in the liquid phase at a temperature between 120° and 170° C. and a pressure up to 10 atmospheres, contacting the resulting oxidation mixture which contains 30 to 98% by weight of cyclohexane with a 10 to 30% aqueous solution of an alkali compound selected from the group consisting of alkali hydroxides and alkali carbonates at a temperature between 60° and 150° C. for a period of 2 to 60 minutes, separating the aqueous phase from said oxidation mixture, distilling off cyclohexane from said oxidation mixture until the content thereof is less than 20% by weight, adding an alkali compound selected from the group consisting of alkali hydroxides and alkali carbonates to said oxidation mixture in an amount which corresponds to 0.20 to 0.95 equivalent of the esters contained in said oxidation mixture, heating the oxidation mixture to which the alkali compound has been added at a temperature of 130° to 160° C. for a period of 0.1 to 10 minutes, and recovering pure cyclohexanone and pure cyclohexanol by distillation of said oxidation mixture without previous separation of said alkali compound.

2. A process as claimed in claim 1 wherein the oxidation of the cyclohexane is carried out in the presence of an oxidation catalyst.

3. A process as claimed in claim 1 wherein the aqueous phase is employed in a ratio to the reaction mixture such that the alkali content of said alkali compound in the aqueous phase, after contacting the oxidation mixture which contains 30 to 98% by weight of cyclohexane with the aqueous solution of the alkali compound, is 1 to 10% by weight.

4. A process as claimed in claim 1 wherein the amount of alkali compound which is added to the oxidation mixture which contains less than 20% by weight of cyclohexane is 0.30 to 0.75 equivalent of the esters contained in the oxidation mixture.

5. A process as claimed in claim 1 wherein the amount of alkali compound added to the oxidation mixture which contains less than 20% by weight of cyclohexane is 0.30 to 0.50 equivalent of the esters contained in said oxidation mixture.

6. A process as claimed in claim 1 wherein the duration of said first alkali treatment is 5 to 25 minutes.

7. A process as claimed in claim 1 wheren a potassium compound is used as the alkali compound for the second alkali treatment.

References Cited by the Examiner
UNITED STATES PATENTS 2,938,924   5/60   Simon et al. _____ 260—586

LORRAINE A. WEINBERGER, *Acting Primary Examiner.*

CHARLES B. PARKER, LEON ZITVER, *Examiners.*